(12) United States Patent
Kirkpatrick

(10) Patent No.: US 6,439,293 B1
(45) Date of Patent: Aug. 27, 2002

(54) CLIMATE CONTROL CURTAIN FOR AUTOMOBILES

(76) Inventor: Brian J. Kirkpatrick, 71 Highland Ave., Basking Ridge, NJ (US) 07920

( * ) Notice: Subject to any disclaimer, the term of this patent is extended or adjusted under 35 U.S.C. 154(b) by 0 days.

(21) Appl. No.: 09/871,844

(22) Filed: Jun. 1, 2001

(51) Int. Cl.[7] .................................................. A47H 7/00
(52) U.S. Cl. ...................................... 160/350; 296/24.1
(58) Field of Search .................................. 160/350, 330, 160/345; 16/87.4 R, 94 R, 94 D, 95 R, 95 D, 96 D; 296/138, 145, 24.1; 248/264, 265; 211/105.4

(56) References Cited

U.S. PATENT DOCUMENTS

| 1,951,660 A | * | 3/1934 | Klaudt | 211/105.4 |
| 2,199,851 A | * | 5/1940 | Culver | 160/330 |
| 2,870,918 A | * | 1/1959 | Grubbs | 211/105.4 |
| 2,903,141 A | * | 9/1959 | Seewack | 211/105.4 |
| 2,964,276 A | * | 12/1960 | Silverthorne | 248/265 |
| 4,621,856 A | | 11/1986 | McKenzie | 296/24 |
| 4,694,531 A | * | 9/1987 | Foy | 16/87.4 R |
| 4,938,518 A | * | 7/1990 | Willemsen | 160/330 X |
| 5,207,722 A | | 5/1993 | Lee | 296/24.1 |
| 5,421,059 A | * | 6/1995 | Leffers | 160/330 |
| 5,733,190 A | | 3/1998 | Wahab | 454/164 |

* cited by examiner

Primary Examiner—David M. Purol
(74) Attorney, Agent, or Firm—Goldstein & Lavas, P.C.

(57) ABSTRACT

A climate control curtain for automobiles including an elongated support member positionable against a roof of an automobile immediately behind a front seat section of the automobile. An elongated support rod is secured to the elongated support member. The support rod has opposed ends. A pair of tension knobs adjustably extend outwardly of the opposed ends of the elongated support rod. The tension knobs each have a foot portion for engaging opposed sides of the automobile. A curtain portion is adapted for slidable coupling with the elongated support rod.

4 Claims, 3 Drawing Sheets

CLIMATE CONTROL CURTAIN FOR AUTOMOBILES

BACKGROUND OF THE INVENTION

The present invention relates to a climate control curtain for automobiles and more particularly pertains to limiting air space within an automobile to make air conditioning and heating more efficient.

The use of vehicle compartment segregating devices is known in the prior art. More specifically, vehicle compartment segregating devices heretofore devised and utilized for the purpose of separating areas of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,207,722 to Lee discloses an attachable transparent partition for controlling the interior's temperature of a passenger vehicle. U.S. Pat. No. 4,621,856 to McKenzie discloses a mountable partition structure for a vehicle to separate the cargo area from the passenger compartment, in order to reduce the load on the heating and air-conditioning system. U.S. Pat. No. 5,733,190 to Wahab discloses a flexible transparent curtain for use in a motor vehicle, to divide a smoking area from a non-smoking area.

While these devices fulfill their respective, particular objective and requirements, the aforementioned patents do not describe a climate control curtain for automobiles for limiting air space within an automobile to make air conditioning and heating more efficient.

In this respect, the climate control curtain for automobiles according to the present invention substantially departs from the conventional concepts and designs of the prior art, and in doing so provides an apparatus primarily developed for the purpose of limiting air space within an automobile to make air conditioning and heating more efficient.

Therefore, it can be appreciated that there exists a continuing need for a new and improved climate control curtain for automobiles which can be used for limiting air space within an automobile to make air conditioning and heating more efficient. In this regard, the present invention substantially fulfills this need.

SUMMARY OF THE INVENTION

In the view of the foregoing disadvantages inherent in the known types of vehicle compartment segregating devices now present in the prior art, the present invention provides an improved climate control curtain for automobiles. As such, the general purpose of the present invention, which will be described subsequently in greater detail, is to provide a new and improved climate control curtain for automobiles which has all the advantages of the prior art and none of the disadvantages.

To attain this, the present invention essentially comprises an elongated support member positionable against a roof of an automobile immediately behind a front seat section of the automobile. When being utilized in an SUV or station wagon, the device can also be installed behind the back seat the separate the passenger compartment from the cargo area. The elongated support member has a T-shaped cross-section including a horizontal upper portion and a vertical lower portion. An elongated support rod is secured to the vertical lower portion of the elongated support member. The support rod has opposed ends. The support rod has a channel extending upwardly of a lower surface thereof and extending a length thereof. A pair of tension knobs adjustably extend outwardly of the opposed ends of the elongated support rod. The tension knobs each have a foot portion for engaging opposed sides of the automobile. Each foot portion has a protective outer layer disposed thereon. A curtain portion is adapted for coupling with the elongated support rod. The curtain portion has an upper edge. The curtain portion has a plurality of linearly aligned apertures' therethrough downwardly of the upper edge. Each of the apertures has a ring positioned therein. Each ring has a vertical member extending upwardly therefrom. Each vertical member has a horizontal member secured thereto. The horizontal members are slidably received within the channel of the elongated support rod.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved climate control curtain for automobiles which has all the advantages of the prior art vehicle compartment segregating devices and none of the disadvantages.

It is another object of the present invention to provide a new and improved climate control curtain for automobiles which may be easily and efficiently manufactured and marketed.

It is a further object of the present invention to provide a new and improved climate control curtain for automobiles which is of durable and reliable construction.

An even further object of the present invention is to provide a new and improved climate control curtain for automobiles which is susceptible of a low cost of manufacture with regard to both materials and labor, and which accordingly is then susceptible of low prices of sale to the consuming public, thereby making such a climate control curtain for automobiles economically available to the buying public.

Even still another object of the present invention is to provide a new and improved climate control curtain for automobiles for limiting air space within an automobile to make air conditioning and heating more efficient.

Lastly, it is an object of the present invention to provide a new and improved climate control curtain for automobiles including an elongated support member positionable against a roof of an automobile immediately behind a front seat section of the automobile. An elongated support rod is secured to the elongated support member. The support rod has opposed ends. A pair of tension knobs adjustably extend outwardly of the opposed ends of the elongated support rod. The tension knobs each have a foot portion for engaging opposed sides of the automobile. A curtain portion is adapted for slidable coupling with the elongated support rod.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
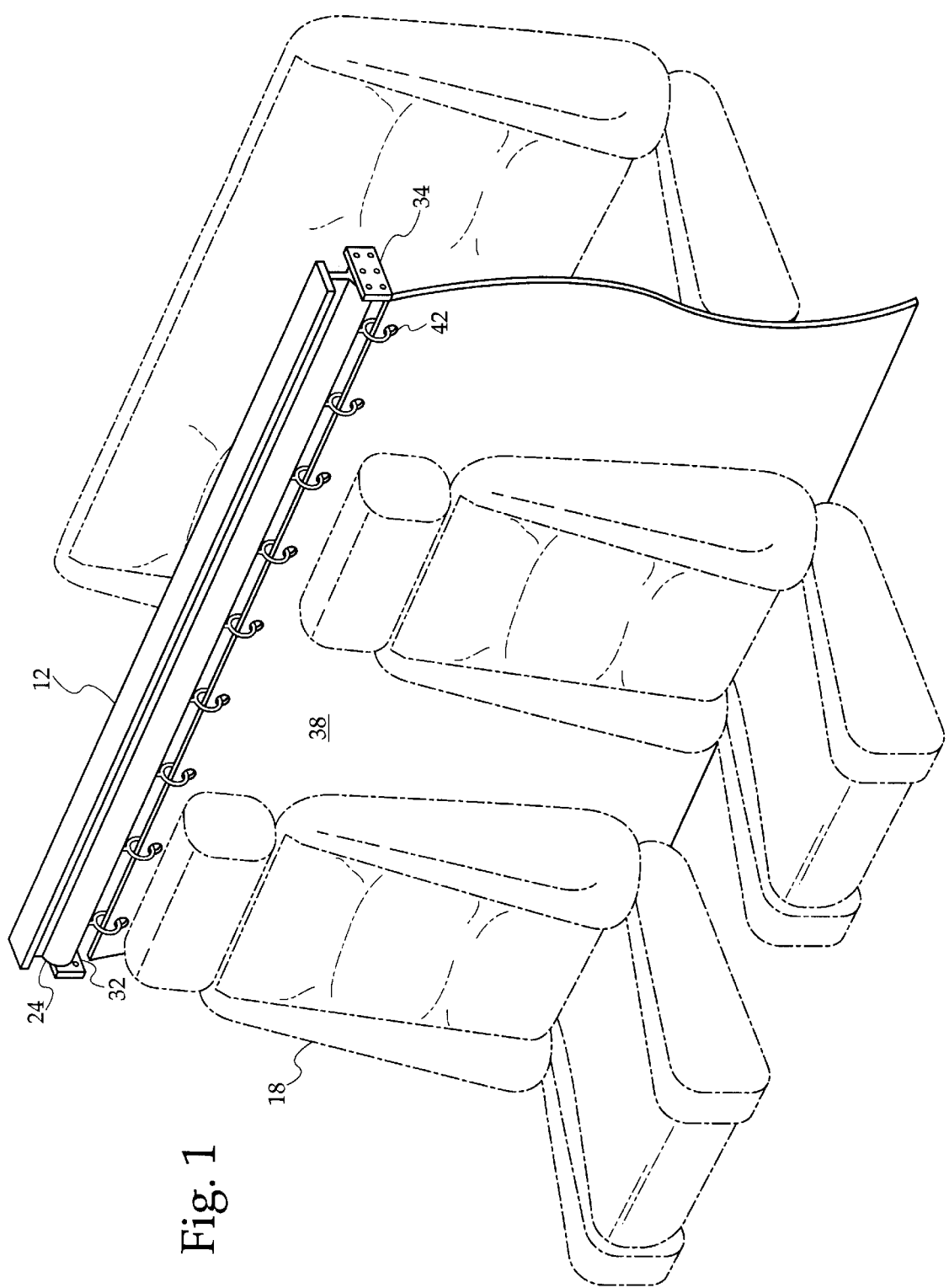
FIG. 1 is a perspective view of the preferred embodiment of the climate control curtain for automobiles constructed in accordance with the principles of the present invention.
Figure 2:
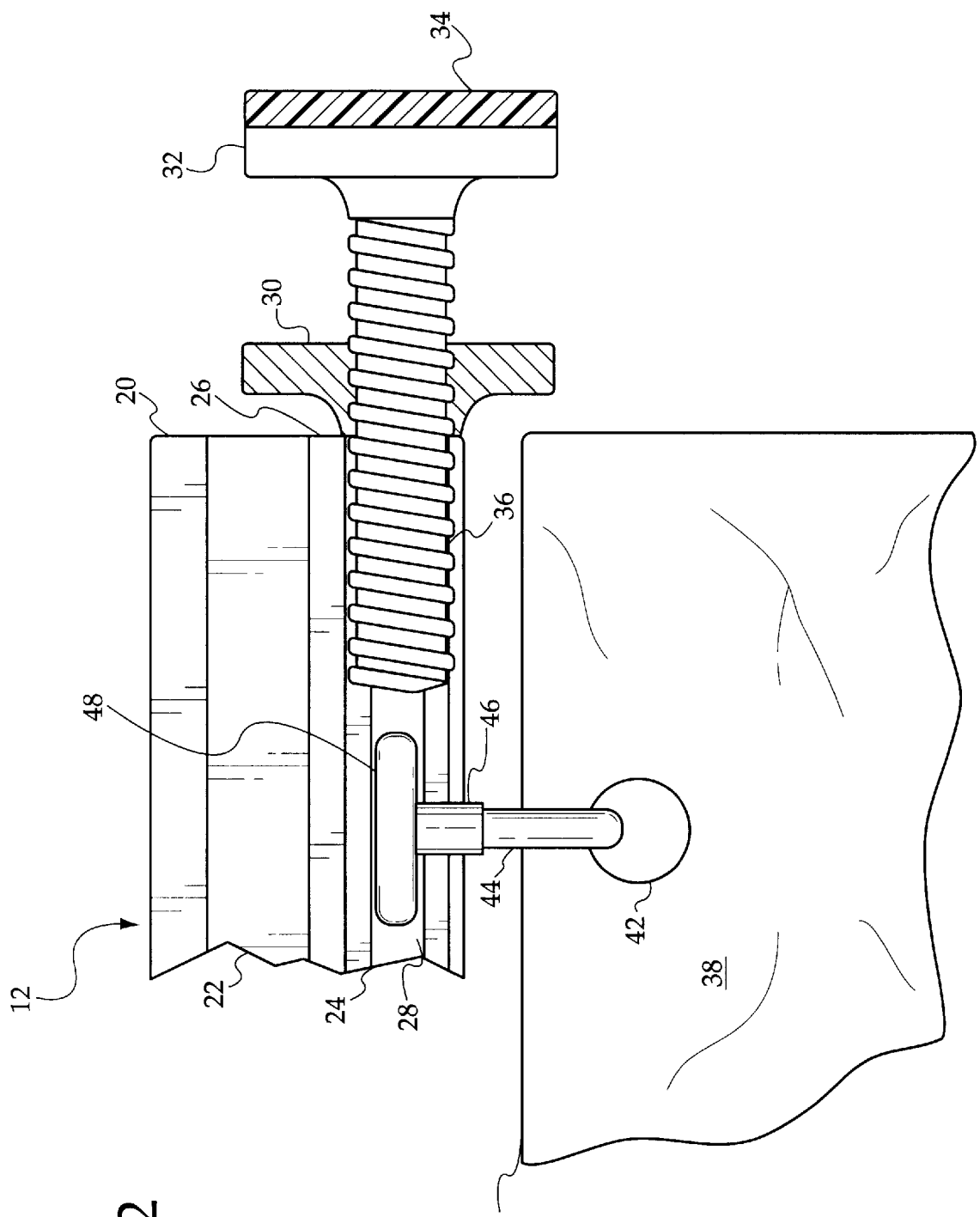
FIG. 2 is a partial side view of the present invention illustrating one of the tension knobs thereof.
Figure 3:
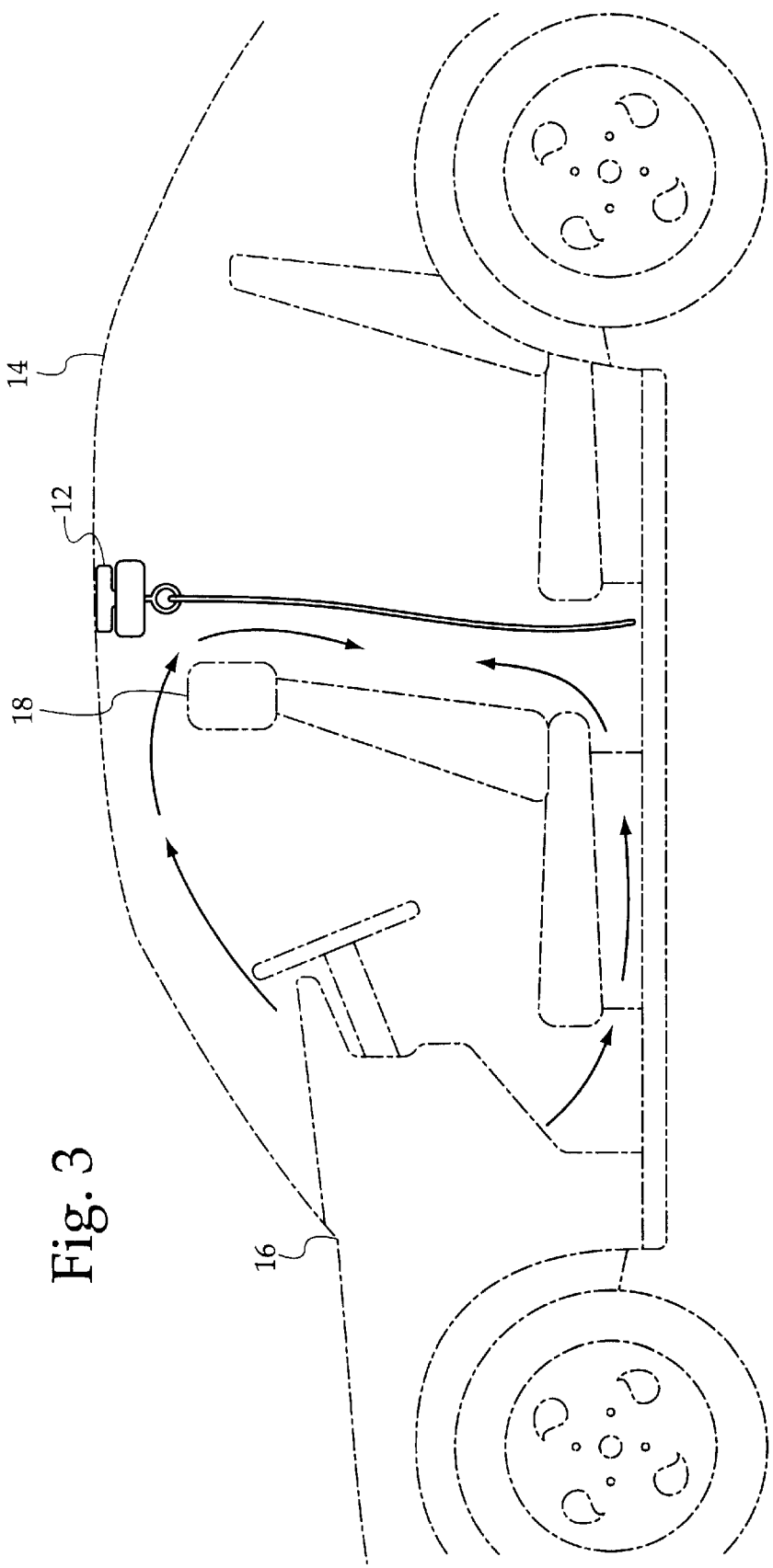
FIG. 3 is a side view of the present invention illustrated in use.

With reference now to the drawings, and in particular, to FIGS. 1 through 3 thereof, the preferred embodiment of the new and improved climate control curtain for automobiles embodying the principles and concepts of the present invention and generally designated by the reference number 10 will be described.

Specifically, it will be noted in the various Figures that the device relates to a climate control curtain for automobiles for limiting air space within an automobile to make air conditioning and heating more efficient. In its broadest context, the device consists of an elongated support member, an elongated support rod, a pair of tension knobs, and a curtain portion. Such components are individually configured and correlated with respect to each other so as to attain the desired objective.

The elongated support member 12 is positionable against a roof 14 of an automobile 16 immediately behind a front seat section 18 of the automobile 16. Note FIGS. 1 and 3. The elongated support member 12 has a T-shaped cross-section including a horizontal upper portion 20 and a vertical lower portion 22. The elongated support member 12 could be permanently affixed to the roof 14 or made a fixture during assembly line production of automobiles.

The elongated support rod 24 is secured to the vertical lower portion 22 of the elongated support member 12. The support rod 24 has opposed ends 26. The support rod 24 has a channel 28 extending upwardly of a lower surface thereof and extending a length thereof.

The pair of tension knobs 30 adjustably extend outwardly of the opposed ends 26 of the elongated support rod 24. The tension knobs 30 each have a foot portion 32 for engaging opposed sides of the automobile 16. Each foot portion 32 has a protective outer layer 34 disposed thereon. The tension knobs 30 each having threaded rods 36 that extending inwardly of the opposed ends of the elongated support rod 24. Note FIG. 2. The tension knobs 30 will be adjusted inwardly or outwardly depending on the width of the automobile 16.

The curtain portion 38 is adapted for coupling with the elongated support rod 24. The curtain portion 38 has an upper edge 40. The curtain portion 38 has a plurality of linearly aligned apertures 42 therethrough downwardly of the upper edge 40. Each of the apertures 42 has a ring 44 positioned therein. Each ring 44 has a vertical member 46 extending upwardly therefrom. Each vertical member 46 has a horizontal member 48 secured thereto. The horizontal members 48 are slidably received within the channel 28 of the elongated support rod 24. Thus, the curtain portion 38 can slide with respect to the elongated support rod 24 to expose a rear section of the automobile 16. When the curtain portion 38 is fully extended, as illustrated in FIG. 1, the flow of air from the heater or air conditioner will not circulate to the rear section of the automobile. This will limit the amount of energy used in heating or cooling a smaller portion of the automobile. When the rear section is occupied, the curtain portion 38 is simply pushed aside to allow the rear section and its occupants to be warmed or cooled.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A climate control curtain for automobiles for limiting air space within an automobile to make air conditioning and heating more efficient comprising, in combination:

an elongated support member positionable against a roof of an automobile immediately behind a front seat section of the automobile, the elongated support member having a T-shaped cross-section including a horizontal upper portion and a vertical lower portion;

an elongated support rod secured to the vertical lower portion of the elongated support member, the support rod having opposed ends, the support rod having a channel extending upwardly of a lower surface thereof and extending a length thereof;

a pair of tension knobs adjustably extending outwardly of the opposed ends of the elongated support rod, the tension knobs each having a foot portion for engaging opposed sides of the automobile, each foot portion having a protective outer layer disposed thereon; and a curtain portion adapted for coupling with the elongated support rod, the curtain portion having an upper edge, the curtain portion having a plurality of linearly aligned apertures' therethrough downwardly of the upper edge, each of the apertures having a ring positioned therein, each ring having a vertical member extending upwardly therefrom, each vertical member having a horizontal member secured thereto, the horizontal members being slidably received within the channel of the elongated support rod.

2. A climate control curtain for automobiles for limiting air space within an automobile to make air conditioning and heating more efficient comprising, in combination:

an elongated support member positionable against a roof of an automobile immediately behind a front seat section of the automobile, the elongated support member has a T-shaped cross-section including a horizontal upper portion and a vertical lower portion with the elongated support rod secured to the vertical lower portion;

an elongated support rod secured to the elongated support member;

a pair of tension knobs adjustably extending outwardly of the opposed ends of the elongated support rod, the tension knobs each having a foot portion for engaging opposed sides of the automobile; and a curtain portion adapted for slidably coupling with the elongated support rod.

3. A climate control curtain for automobiles for limiting air space within an automobile to make air conditioning and heating more efficient comprising, in combination:

an elongated support member positionable against a roof of an automobile immediately behind a front seat section of the automobile;

an elongated support rod secured to the elongated support member, the support rod has a channel extending upwardly of a lower surface thereof and extending a length thereof for receiving the curtain portion therein;

a pair of tension knobs adjustably extending outwardly of the opposed ends of the elongated support rod, the tension knobs each having a foot portion for engaging opposed sides of the automobile; and a curtain portion adapted for slidably coupling with the elongated support rod.

4. The climate control curtain for automobiles as set forth in claim 3, wherein the curtain portion has an upper edge, the curtain portion having a plurality of linearly aligned apertures therethrough downwardly of the upper edge, each of the apertures having a ring positioned therein, each ring having a vertical member extending upwardly therefrom, each vertical member having a horizontal member secured thereto, the horizontal members being slidably received within the channel of the elongated support rod.

* * * * *